(12) United States Patent
Ching et al.

(10) Patent No.: US 11,921,523 B2
(45) Date of Patent: Mar. 5, 2024

(54) CONTROL DEVICE FOR UNMANNED AERIAL VEHICLE AND CONTROL METHOD THEREFOR

(71) Applicants: Yun-Chiu Ching, Taipei (TW); Dai-Yun Tsai, Taipei (TW)

(72) Inventors: Yun-Chiu Ching, Taipei (TW); Dai-Yun Tsai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 268 days.

(21) Appl. No.: 17/669,360

(22) Filed: Feb. 11, 2022

(65) Prior Publication Data

US 2023/0168694 A1 Jun. 1, 2023

(30) Foreign Application Priority Data

Nov. 30, 2021 (TW) .................................. 110144560

(51) Int. Cl.
*G05D 1/00* (2006.01)
*B64C 39/02* (2023.01)
*G06F 3/01* (2006.01)

(52) U.S. Cl.
CPC ........... *G05D 1/101* (2013.01); *B64C 39/024* (2013.01); *G06F 3/017* (2013.01); *B64U 2201/20* (2023.01)

(58) Field of Classification Search
CPC ....... G05D 1/101; B64C 39/024; G06F 3/017; B64U 2201/20
See application file for complete search history.

(56) References Cited

U.S. PATENT DOCUMENTS

| 10,168,700 | B2 | 1/2019 | Gordon et al. |
| 10,244,211 | B2 | 3/2019 | Smolyanskiy et al. |
| 10,261,507 | B2 | 4/2019 | Wang et al. |
| 10,507,917 | B2 | 12/2019 | Taylor et al. |
| 10,551,834 | B2 | 2/2020 | Lee et al. |

(Continued)

FOREIGN PATENT DOCUMENTS

| CN | 106020234 | 10/2016 |
| JP | 2014150348 | 8/2014 |

(Continued)

OTHER PUBLICATIONS

Sunaba Koza, "Attach a 360-degree camera [Insta360 One] to the drone [Phantom3 Standard] and take an aerial shot of the sea of Okinawa!", retrieved on May 2019, with English translation thereof. Available at: https://sunabaco.ltd/2019/05/03/blog-03/.

(Continued)

*Primary Examiner* — Mathew Franklin Gordon
(74) *Attorney, Agent, or Firm* — JCIPRNET

(57) ABSTRACT

A control device for an unmanned aerial vehicle (UAV) and a control method therefor are provided. The control device includes a sensing device, an image receiver, a control transmitter, a display, and a processor. The sensing device is used to sense an action of the user. The image receiver is used to receive an image including at least a part or all of the body in the UAV from a first image capturing device of the UAV. The processor uses the display to continuously present the image. The processor obtains the action by the sensing device, converts the action into the control signal corresponding to the UAV, and transmits the control signal to the UAV through the control transmitter. The UAV is controlled by the control signal transmitted by the control device.

15 Claims, 13 Drawing Sheets

(56) References Cited

U.S. PATENT DOCUMENTS

| | | |
|---|---|---|
| 10,795,353 B2 | 10/2020 | Bachrach et al. |
| 10,824,141 B2 | 11/2020 | Chen |
| 10,860,040 B2 | 12/2020 | Hu et al. |
| 2020/0272144 A1 | 8/2020 | Yang et al. |

FOREIGN PATENT DOCUMENTS

| | | |
|---|---|---|
| JP | 2018165066 | 10/2018 |
| JP | 2021179924 | 11/2021 |
| KR | 20170090603 | 8/2017 |
| TW | I616802 | 3/2018 |
| TW | I667054 | 8/2019 |
| TW | I711560 | 12/2020 |
| WO | 2008045144 | 4/2008 |

OTHER PUBLICATIONS

"Office Action of Japan Counterpart Application", dated Apr. 11, 2023, p. 1-p. 6.

"Office Action of Taiwan Counterpart Application", dated Oct. 4, 2022, p. 1-p. 6.

CONTROL DEVICE FOR UNMANNED AERIAL VEHICLE AND CONTROL METHOD THEREFOR

CROSS-REFERENCE TO RELATED APPLICATION

This application claims the priority benefit of Taiwan application serial no. 110144560, filed on Nov. 30, 2021. The entirety of the above-mentioned patent application is hereby incorporated by reference herein and made a part of this specification.

BACKGROUND

Field of the Disclosure

The disclosure relates to a human-machine interaction technology, and particularly relates to a control device for an unmanned aerial vehicle (UAV) and a control method therefor.

Description of Related Art

The current unmanned aerial vehicle (UAV) mainly utilizes radio remote control equipment and related programs to control or manipulate the corresponding UAV. The UAV at the low-altitude line of sight is used for leisure and entertainment and aerial photography. Moreover, if an image capturing device (such as cameras, video cameras) and head-mounted display devices (commonly known as goggle) are arranged on the UAV, the images captured by the image capturing device can be presented through wireless transmission on the head-mounted display device, allowing the user to control the UAV through the first-person view (FPV). This kind of system can also be called the FPV traversing machine.

However, because the FPV traversing machine is controlled through the FPV for operation, it is difficult for beginners to get started. Moreover, they need to be familiar with the operation of the radio remote control (for example, learn to perform four actions including controlling throttle, rolling, direction and pitch) in order to smoothly operate the FPV traversing machine. Therefore, whether the operation of the FPV traversing machine can be simpler by other means is one of the issues to be explored.

SUMMARY OF THE DISCLOSURE

The disclosure provides a control device for an unmanned aerial vehicle (UAV) and a control method therefor, which provide a more intuitive way to monitor the condition of the UAV and then control the UAV, thereby reducing the difficulty of control.

The disclosure provides a control device for UAV. The control device includes a sensing device, an image receiver, a control transmitter, a display, and a processor. The sensing device is used to sense an action of the user. The image receiver is used to receive an image including at least a part or all of the body in the UAV from a first image capturing device of the UAV. The control transmitter is used to transmit control signals to the UAV. The processor is coupled to the sensing device, the image receiver, the control transmitter, and the display. The processor uses the display to continuously present the image received through the image receiver. The processor obtains the action by the sensing device, converts the action into the control signal corresponding to the UAV, and transmits the control signal to the UAV through the control transmitter. The UAV is controlled by the control signal transmitted by the control device.

The disclosure provides a control method for UAV, which is adaptable for a control device. The control method includes the following steps: receiving an image including at least a part or all of the body in the UAV from a first image capturing device of the UAV; continuously presenting the image on the display of the control device; sensing the user's action, and converting the action into a control signal corresponding to the UAV; and, transmitting the control signal to the UAV, and the UAV is controlled by the control signal.

Based on the above, the control device for UAV and the control method therefor provided in the disclosure configure an image capturing device with a third-person view on the UAV, so that the user can intuitively see the UAV machine through the screen/image from the third-person view, and detect the user's actions (such as gestures, lip movement, or corresponding operating means) to control the UAV accordingly. In this way, the UAV system of the disclosure provides a more intuitive way to control the UAV by providing a third-person view combined with the user's somatosensory operation, thereby reducing the difficulty of control.

DESCRIPTION OF EMBODIMENTS

Figure 1:
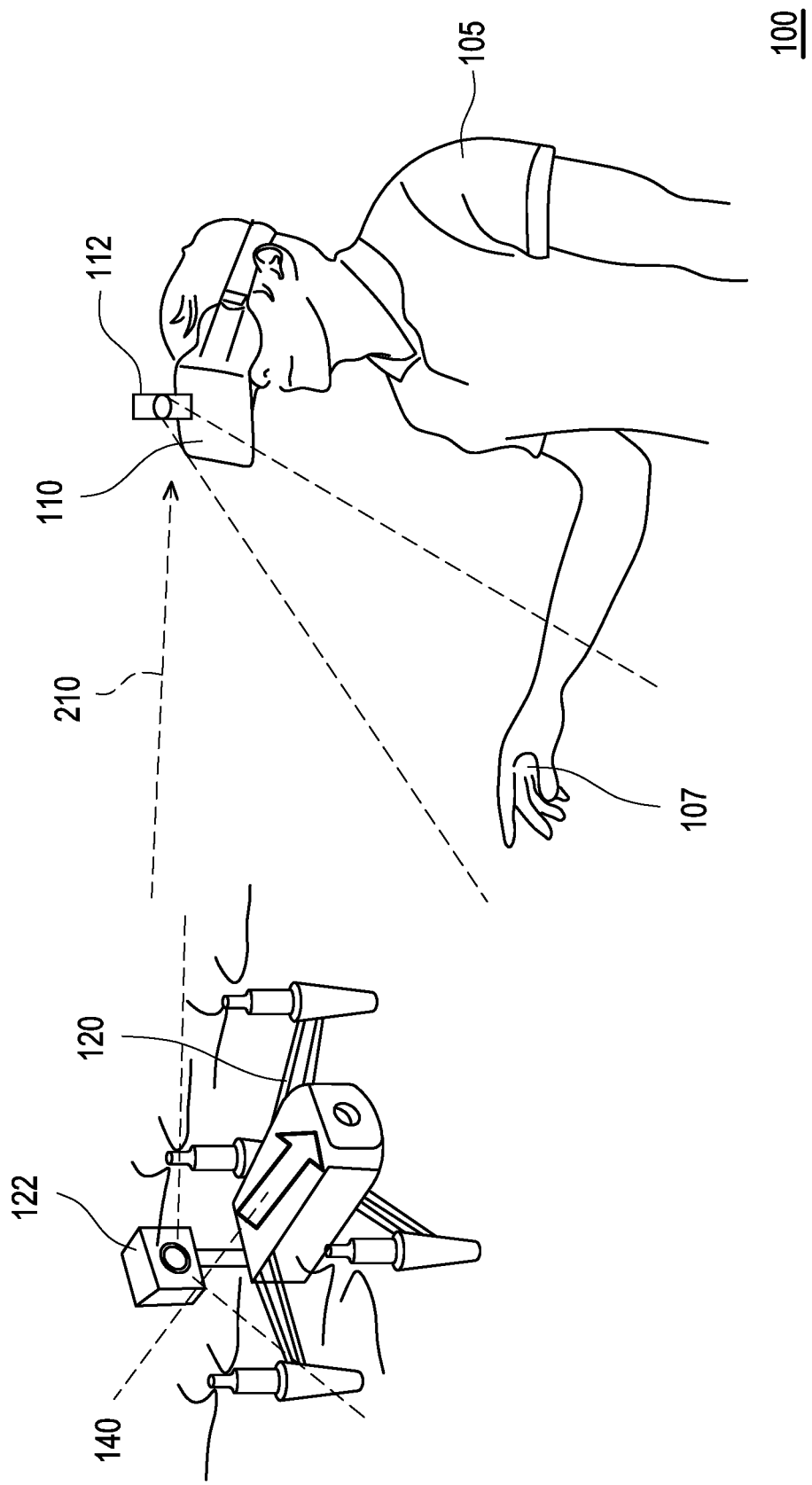
FIG. 1 is a schematic diagram of a UAV system according to the first embodiment of the disclosure.
Figure 2:
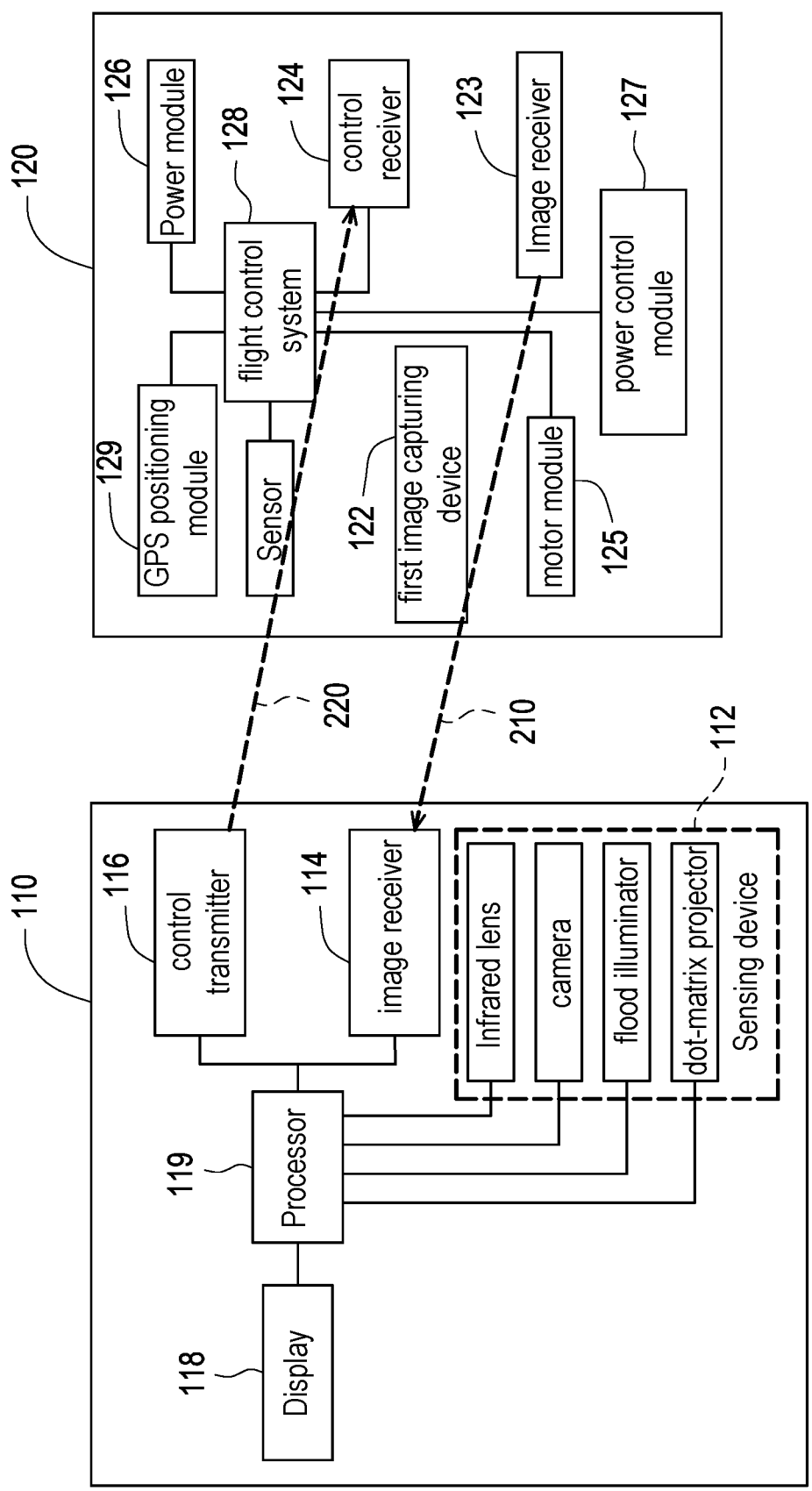
FIG. 2 is a block diagram of a UAV system according to the first embodiment of the disclosure.

FIG. 1 is a schematic diagram of a UAV system 100 according to the first embodiment of the disclosure. FIG. 2 is a block diagram of a UAV system 100 according to the first embodiment of the disclosure. Please refer to FIG. 1 and FIG. 2 at the same time. The UAV system 100 includes a UAV120 and a control device 110.

The control device 110 mainly includes a sensing device 112, an image receiver 114, a control transmitter 116, a display 118, and a processor 119. The processor 119 is coupled to the sensing device 112, the image receiver 114, the control transmitter 116 and the display 118. The control device 110 of the first embodiment in FIG. 1 is exemplified as a head-mounted display device. The head-mounted display device applied to the UAV system 100 may also be referred to as goggle.

The UAV120 mainly includes a first image capturing device 122. The first image capturing device 122 is mainly used to capture images of at least a part or all of the body in the UAV120. The arrow 140 in FIG. 1 is used to indicate the direction of view when the first image capturing device 122 captures an image, so that more of a part of body in the UAV120 can be obtained from the image. UAV120 further includes an image transmitter 123, a control receiver 124, a motor module 125, a power module 126, a power control module 127, a flight control system 128, a GPS positioning module 129 and other components.

The image captured by the first image capturing device 122 can be referred to as a "third-person view" image. The so-called third-person view is that the user simultaneously observes the actions of the protagonist (referred to as UAV120 in this embodiment) and the surrounding environment from the perspective of a bystander, so that it is easy to know the condition of the UAV120 itself and the surrounding environment. The flight control system 128 of the UAV120 transmits the image captured by the first image capturing device 122 to the image receiver 114 of the control device 110 through the image transmitter 123 through wireless communication technology, as shown by the arrow 210 in FIG. 2.

The flight control system 128 of the UAV120 controls the takeoff, landing, acceleration, and deceleration of the UAV120 through the motor module 125, the power module 126, and the power control module 127. In this embodiment, the UAV120 can perform a return operation when its power is insufficient. The flight control system 128 of the UAV120 utilizes the GPS positioning module 129 and the corresponding sensing device 112 to determine its own position and the distance from the control device 110 to determine when to perform a return operation, and automatically plan the return route. The light-emitting diode (LED) on the UAV120 is configured to show the current state of the UAV120, so that the user can be visually informed.

The control transmitter 116 of the control device 110 transmits the control signal for controlling the UAV120 to the control receiver 124 of the UAV120, as shown by the arrow 220 in FIG. 2. The UAV120 is controlled by the control signal transmitted by the control device 110.

The image receiver 114 of the control device 110 receives an image including at least a part or all of the body in the UAV120 from the first image capturing device 122 of the UAV120. The processor 119 of the control device 110 uses the display 118 to continuously present the images received through the image receiver 114.

The UAV system 100 of the embodiment of the disclosure not only provides a third-person view to the user 105 through the display 118 on the head-mounted display device, but also controls the UAV120 along with the somatosensory operation of the user 105. For example, the sensing device 112 of the control device 110 is configured to sense the movement of the user 105. The "action" in the first embodiment is exemplified as the hand action of the user 105, and those applying this embodiment can manipulate the UAV120 with the user's left or right hand. The processor 119 obtains the user's action (such as hand action, lip action, or somatosensory action performed by the user) through the sensing device 112, converts the foregoing action into a control signal corresponding to the UAV120, and transmits the control signal to the control receiver 124 of the UAV120 through the control transmitter 116 (as shown by the arrow 220), so as to control the UAV120 through somatosensory actions.

The sensing device 112 of FIG. 1 is mainly arranged in front of the head-mounted display device, and the sensing device 112 includes a second image capturing device for capturing a second image including the hand of the user 105, and capturing the hand area 107 in the second image. In addition to adopting the second image capturing device as the sensing device 112, this embodiment can also comprehensively integrate one of infrared image capturing device, flood illuminator, dot-matrix projector and other image and light capturing technologies or a combination thereof to determine the hand area 107 of the user 105, thereby further improving the sensing accuracy of the hand area 107.

Figure 3:
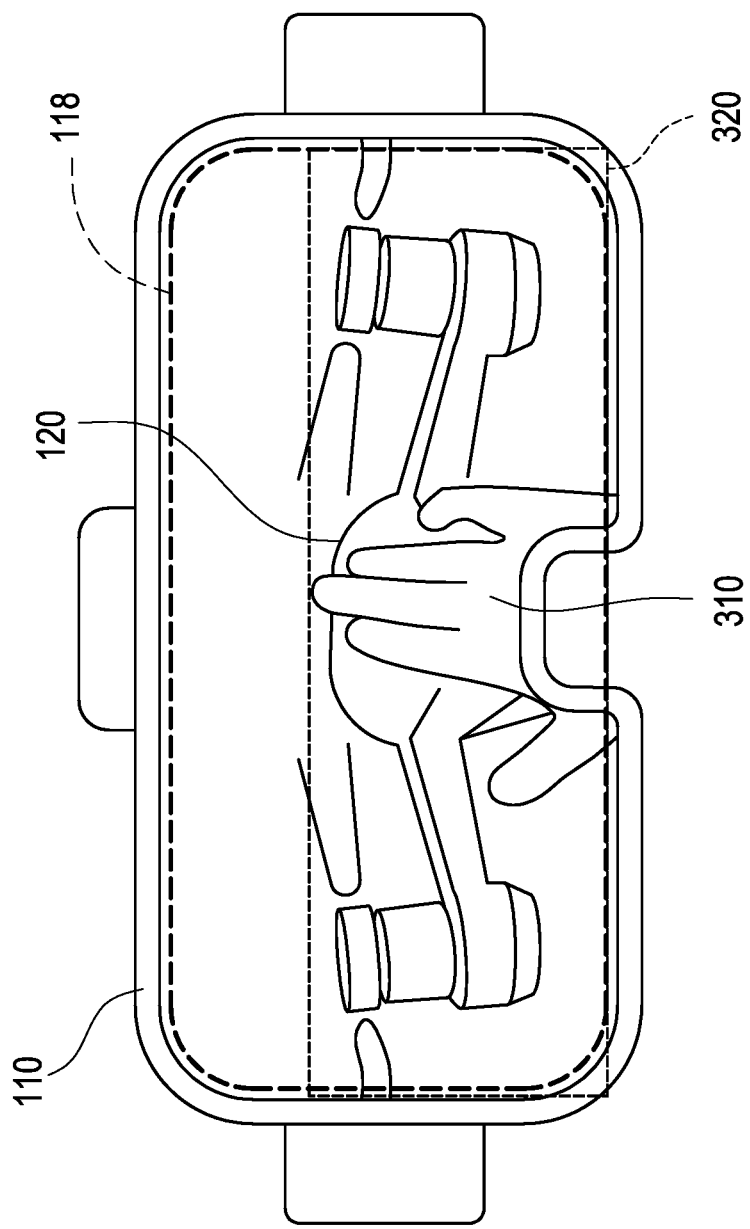
FIG. 3 is a schematic diagram of an interface using a head-mounted display device as the display of the control device in the first embodiment.

FIG. 3 is a schematic diagram of an interface using a head-mounted display device as the display 118 of the control device 110 in the first embodiment. Referring to FIG. 3, since the first embodiment uses a head-mounted display device as the control device 110, the processor 119 generates a virtual hand image 310 according to the hand action in the hand area 107, and superimposes the virtual hand image 310 on the image presented on the display 118, so that the user can more intuitively see the image including part of the body of UAV120 and the environment on the display 118, as well as the virtual hand image 310 of the user himself/herself.

In order to avoid excessive processing of the second image including the hand, this embodiment can set the gesture range (as shown in the dashed line box 320 in FIG. 3) for the second image capturing device (sensing device 112) when capturing the image and display the image on the display 118. In this way, the user can intuitively know the virtual hand image 310 and the effective range of hand sensing. In detail, the gesture range is mainly used to prompt the user to easily recognize the area for hand action. In this embodiment, the hand action within the gesture range is mainly used to determine the user's gesture, and then used as the control signal corresponding to identification. However, if the user's gesture is too large and out of the gesture range, this embodiment will still use the image outside the gesture range to recognize and determine the gesture, but the recognition success rate of hand gesture might be reduced due to many factors. For example, the hand action is distant from the sensing device 112, the image is distorted due to lens problems . . . etc. In other words, the gesture range shown by the dashed line box 320 in FIG. 3 is mainly used to let the user know a better identification area for the hand gesture. If the hand gesture accidentally exceeds the dashed line box 320, the processor 119 in FIG. 2 might still identify images outside the gesture range.

Please refer to FIG. 1 to FIG. 3 at the same time. In terms of the operation of the user 105, the control device 110 may be provided with a physical button on its body, or a virtual unlock button may be presented in the user interface presented on the display 118. When the user 105 presses the physical button/virtual unlock button, the processor 119 starts to recognize the hand action in the hand area 107 through the second image capturing device (sensing device 112), and the hand action in the hand area 107 is changed to a virtual hand images 310 and superimposed on the image presented on the display 118. For example, the processor 119 enters the gesture pairing mode after the physical button/ virtual unlock button is pressed, and the user 105 is asked to place the user's palm down and place the palm in the effective range of the screen. Under the circumstances, the virtual hand image 310 will be located in the dashed line box 320 in FIG. 3 with the palm facing down. Then, the processor 119 can determine whether the user 105 uses the left hand or the right hand to control the UAV120 according to the virtual hand image 310. After completing the gesture pairing mode (that is, determining that the user 105 uses the left or right hand to control the UAV120), the processor obtains the hand area 107 through the second image capturing device (sensing device 112) to sense the hand action of the user 105. The hand action is recognized as one of multiple types of preset gestures, and the recognized gesture type is converted into a corresponding control signal.

Figure 4:
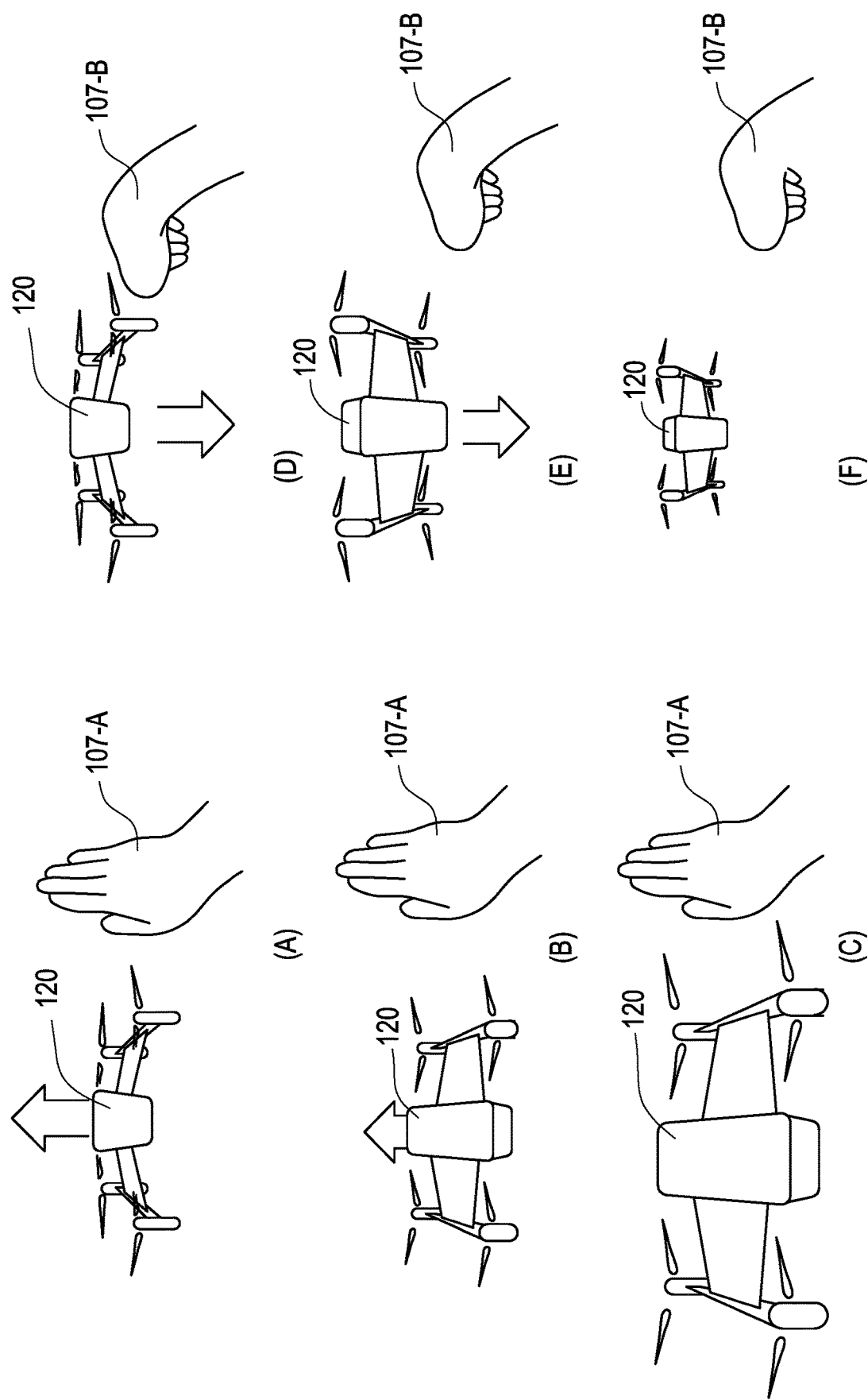
FIG. 4, FIG. 5, and FIG. 6 are schematic diagrams of UAV control signals corresponding to multiple types of preset gestures.
Figure 5:
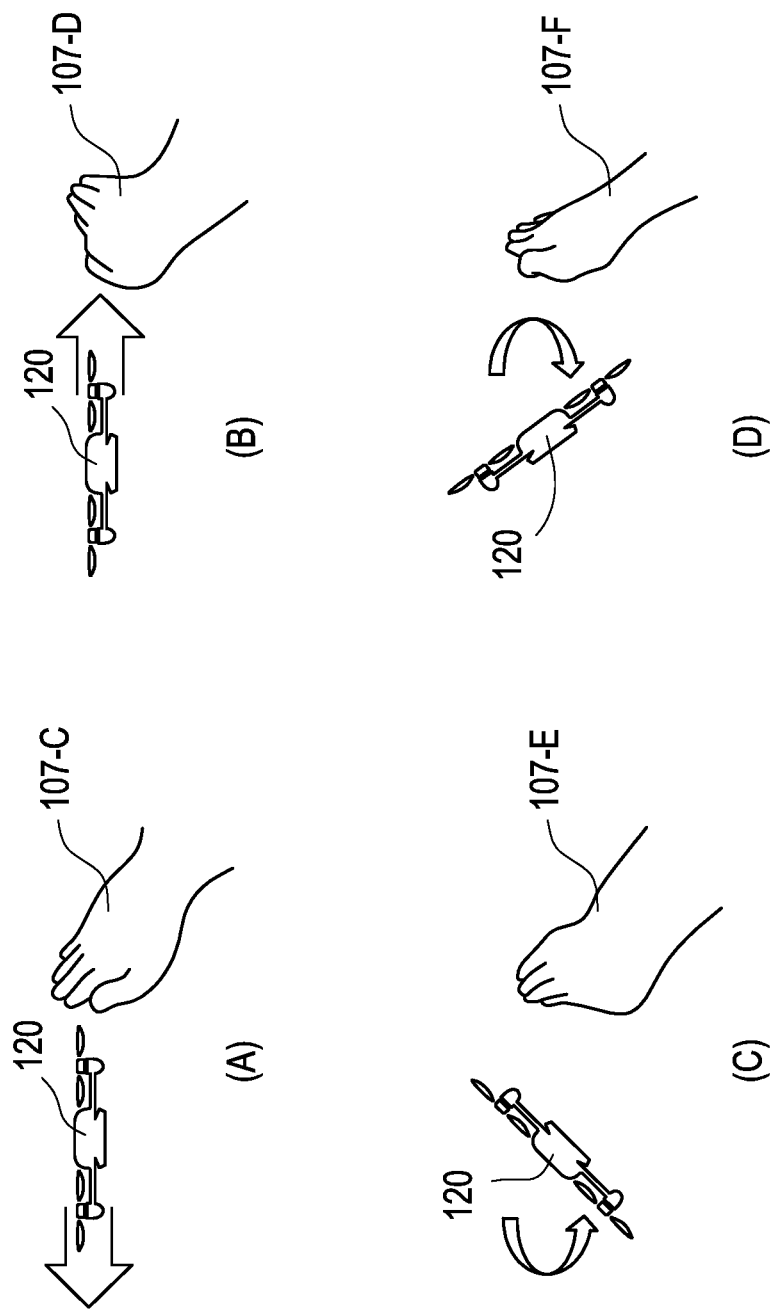
Figure 6:
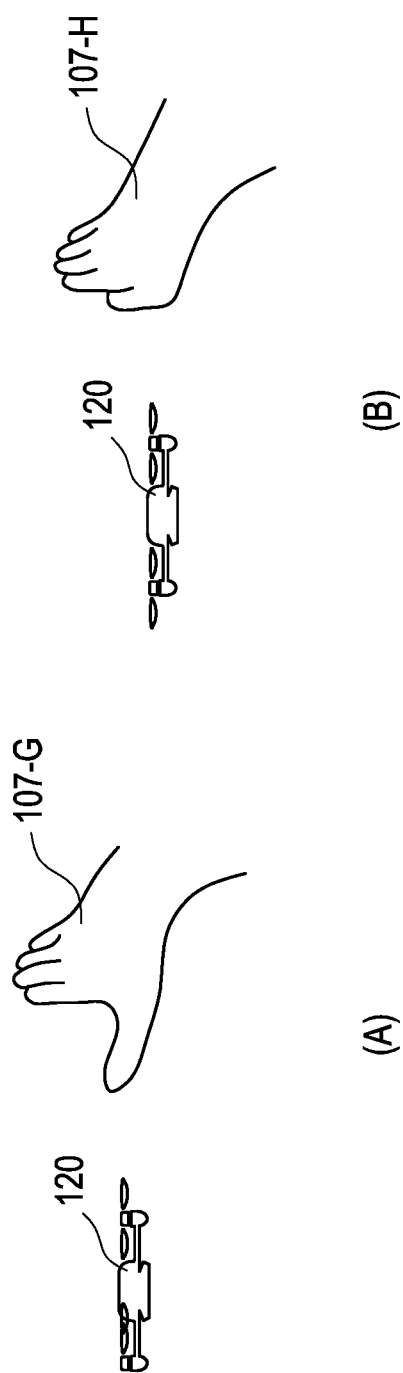

In detail, the processor 119 has a gesture activity recognition module, and recognizes the hand action corresponding to the hand area 107 as one of these preset gesture types through the gesture activity recognition module. FIG. 4, FIG. 5, and FIG. 6 are schematic diagrams of control signals of UAV120 corresponding to multiple types of preset gestures.

FIG. 4(A) to FIG. 4(C) show that when the preset gesture type 107-A is the back of hand in upright status, the control signal is "UAV120 tilts backwards, flying backwards", and the continuous actions of UAV120 following the above hand gesture are as follows: After UAV120 in FIG. 4(A) receives the control signal, UAV120 raises the angle of its advancing direction to turn into UAV120 in FIG. 4(B), and UAV120 in FIG. 4(C) gradually flies towards the user and is slightly enlarged visually. FIG. 4(D) to FIG. 4(F) show that when the preset gesture type 107-B is the back of hand in a drooping manner, the control signal is "UAV120 tilts forward and flies forward", and the continuous actions of UAV120 following the above hand gesture are as follows: After receiving the control signal, the UAV120 in FIG. 4(D) adjusts the angle of its advancing direction downward to turn into the UAV120 in FIG. 4(E), and the UAV120 in FIG. 4(F) gradually moves away from the user and is slightly shrank visually.

FIG. 5(A) shows that when the preset gesture type 107-C is palm down and the hand is to the left, the control signal is "UAV120 flies to the left". FIG. 5(B) shows that when the preset gesture type 107-D is palm down and the hand is to the right, the control signal is "UAV120 flies to the right". FIG. 5(C) shows that when the preset gesture type 107-E is palm to the right, the control signal is "UAV120 rolls to the right". FIG. 5(D) shows that when the preset gesture type 107-F is palm to the left, the control signal is "UAV120 rolls to the left".

FIG. 6 shows that the processor 119 determines the opening angle of purlicue (that is, the angle between the pointing direction of the thumb and the pointing direction of the index finger) in the preset gesture types 107-G and 107-H to determine the range of throttle of UAV120. FIG. 6(A) shows that the angle between the pointing direction of the thumb and the pointing direction of the index finger in the preset gesture type 107-G is almost 90 degrees, and therefore the throttle of UAV120 is completely closed, that is, the motor module of UAV120 does not provide power for flying. When the angle between the pointing direction of the thumb and the pointing direction of the index finger in the preset gesture type is between 90 degrees and 45 degrees, the throttle of the UAV120 is in a semi-open state, that is, the motor module of the UAV120 provides half of the power for flying. FIG. 6(B) shows that the angle between the pointing direction of the thumb and the pointing direction of the index finger in the preset gesture type 107-G is between 45 degrees and 0 degrees, and therefore the throttle of UAV120 is fully open, that is, the motor module of UAV120 provides all the power for flying. The gesture activity recognition module can analyze the first gesture type corresponding to the input hand area through the preset gesture types in FIG. 5 and FIG. 6, so as to convert the first gesture type into a corresponding control signal. Those applying this embodiment can adjust the relationship between the preset gesture type and UAV control according to their needs, for example, the left-hand operation can be used as the preset gesture type, different hand gestures can be used for controlling the range of throttle . . . etc.

Returning to FIG. 1 to FIG. 3, when the processor 119 converts the first gesture type into a corresponding control signal, the control signal is transmitted to the UAV120 (see arrow 220), so that the UAV120 controls its motor module 125 to perform corresponding actions. In addition, the user 105 can touch the physical button/virtual unlock button again to turn off the corresponding function of controlling the UAV120 with hand gestures in this embodiment.

Figure 7:
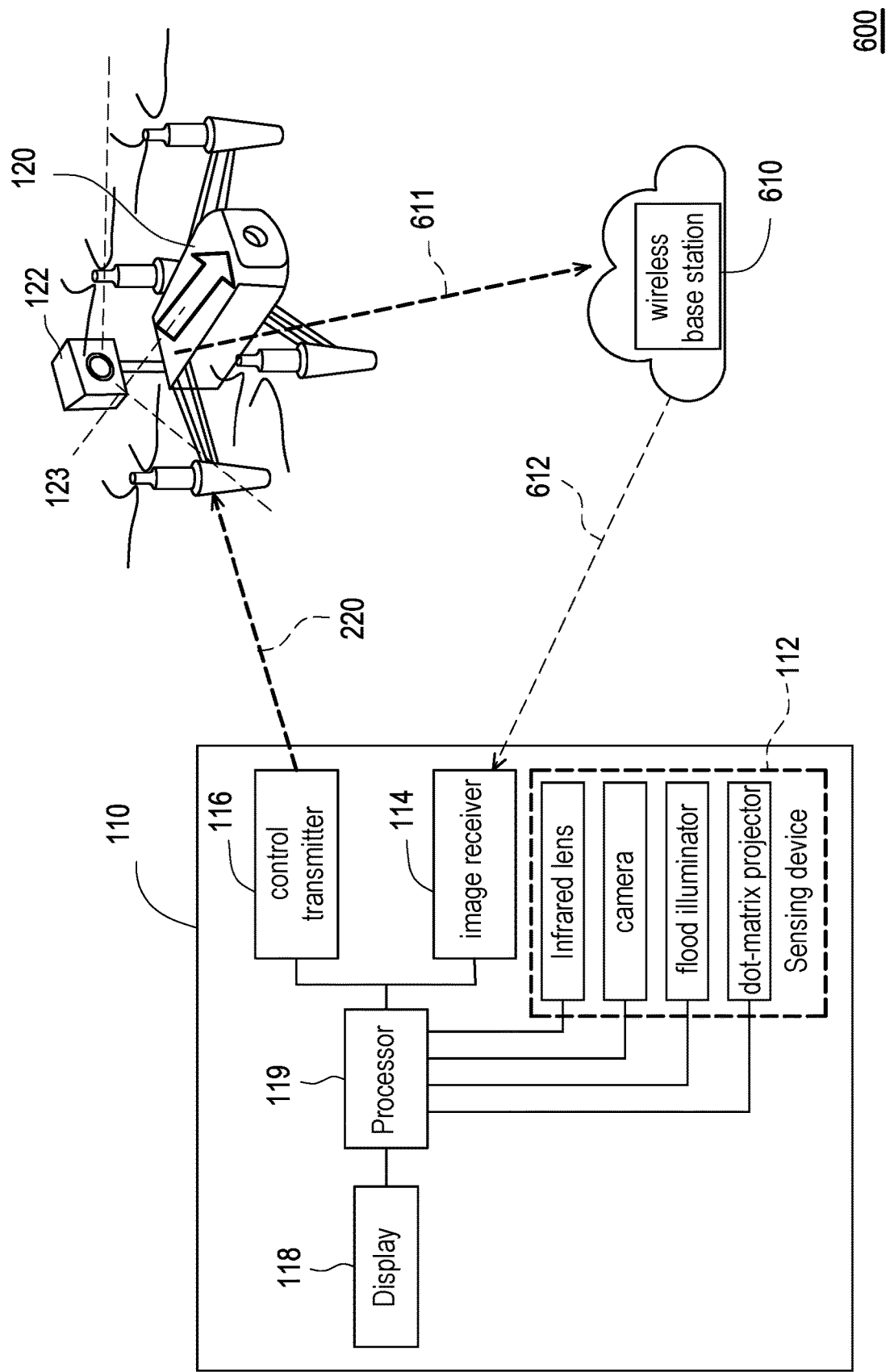
FIG. 7 is a schematic diagram of the UAV system in the second embodiment wirelessly transmitting the image captured in the UAV to the control device through a wireless base station.

FIG. 7 is a schematic diagram of the UAV system 600 in the second embodiment wirelessly transmitting the image captured in the UAV120 to the control device 110 through a wireless base station 610. The control device 110 and the UAV120 of the first embodiment respectively use the image receiver 114 and the image transmitter 123 in FIG. 2 to directly transmit images. In comparison, the UAV120 of the UAV system 600 in the second embodiment uses an image capturing device compliant with the 5G wireless network protocol as the first image capturing device 122, and transmits the captured images to the core network compliant with the 5G wireless network protocol and the wireless base station 610 as an intermediate station (as shown by arrow 611 in FIG. 7) first, then transmits the images from the wireless base station 610 to the control device 110.

Figure 8:
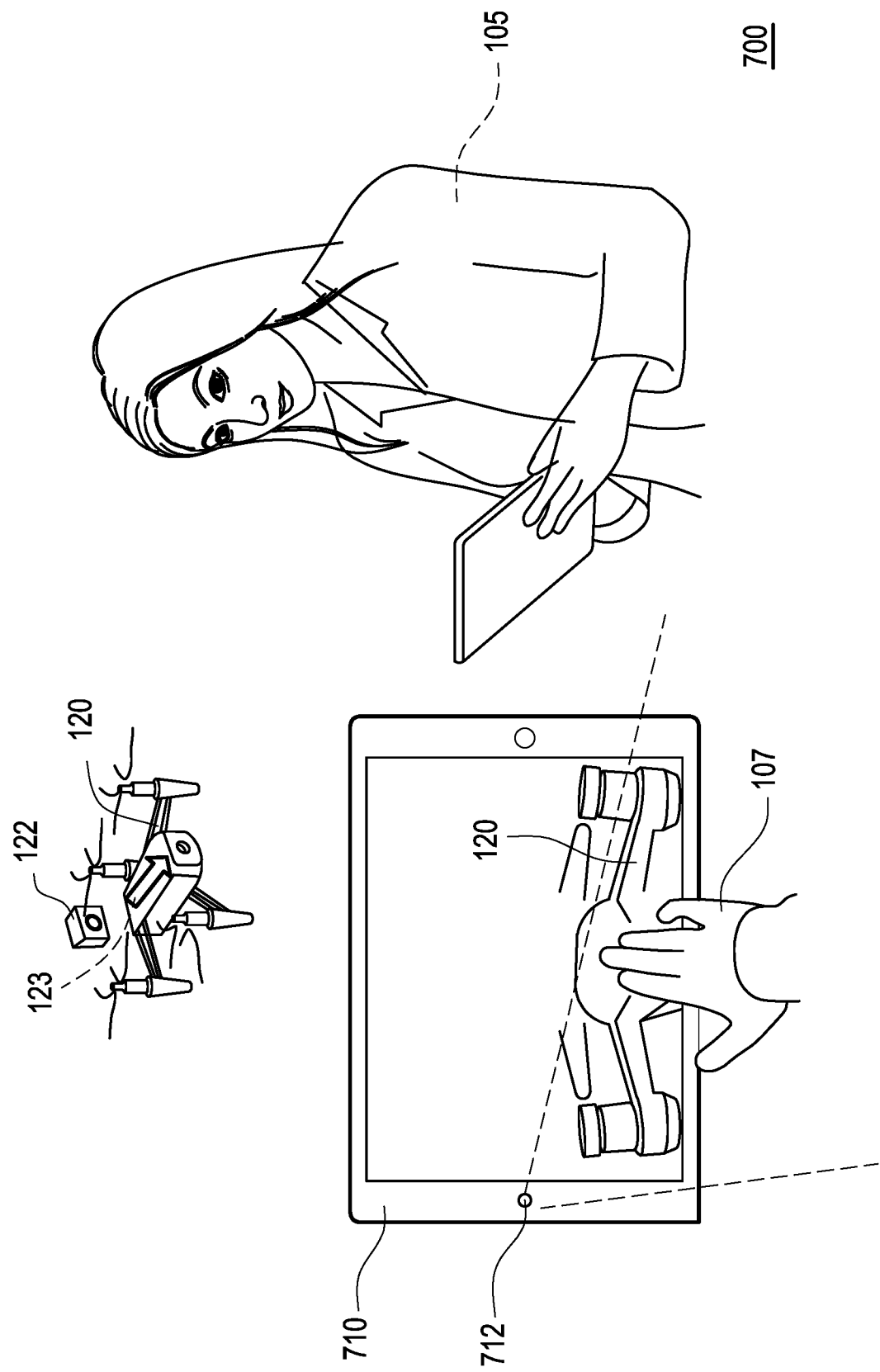
FIG. 8 is a schematic diagram of a UAV system according to the third embodiment of the disclosure.

FIG. 8 is a schematic diagram of a UAV system 700 according to the third embodiment of the disclosure. The main difference between the third embodiment and the first embodiment is that the control device 710 is changed from a head-mounted display device to a mobile electronic device (for example, a tablet computer, a smart phone, or an electronic device with a front lens) in implementation. That is, the sensing device 712 in the control device 710 is disposed in the mobile electronic device facing a direction of the user 105, and the sensing device 712 includes the second image capturing device. The second image capturing device (sensing device 712) is used to capture a second image including the hand of the user 105, and capture the hand area 107 in the second image. The processor in the control device 710 obtains the hand area 107 through the second image capturing device (sensing device 712) to sense the user's hand action, recognizes the hand action as a first gesture type of multiple preset gesture types through the gesture activity recognition module, and converts the first gesture type into a corresponding control signal to control the UAV120.

Figure 9:
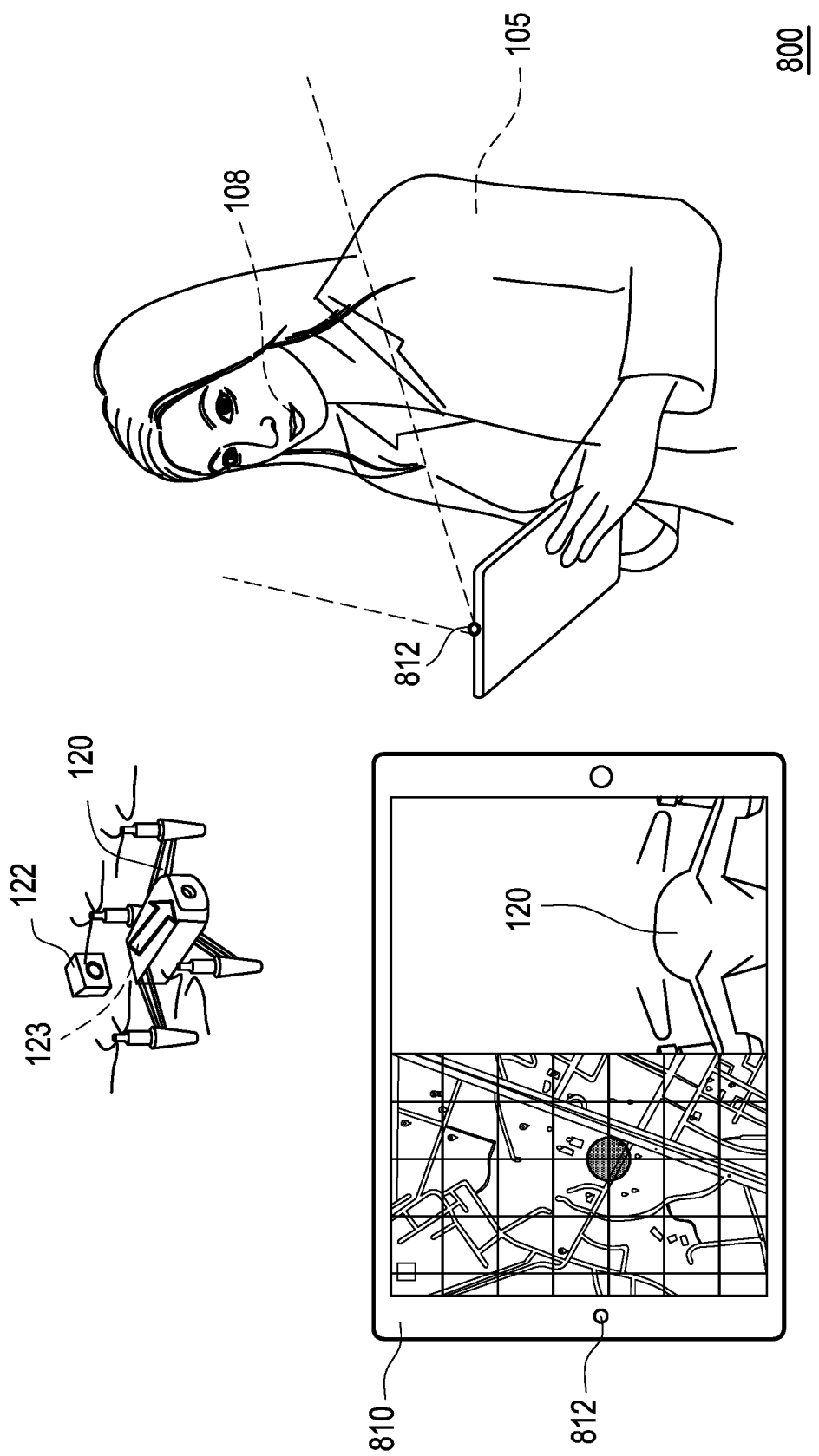
FIG. 9 is a schematic diagram of a UAV system according to the fourth embodiment of the disclosure.

FIG. 9 is a schematic diagram of a UAV system 800 according to the fourth embodiment of the disclosure. The control device 810 in the fourth embodiment and the third embodiment are all implemented as a mobile electronic device (for example, a tablet computer, a smart phone, or an electronic device with a front lens). That is, the sensing device 812 in the control device 810 is disposed in the mobile electronic device facing a direction of the user 105, and the sensing device 812 includes a second image capturing device. The fourth embodiment is different from the third embodiment in that the processor of the control device 810 captures the second image including the lips of the user

105 through the second image capturing device (sensing device 812), and captures the lip area 108 in this second image.

The processor of the control device 810 obtains the lip area 108 through the second image capturing device (sensing device 812) to sense the lip movement of the user 105, and uses the lip activity recognition module to recognize lip movements to obtain speech text information of the user 105, and converts the speech text information into corresponding control signals.

Figure 10:
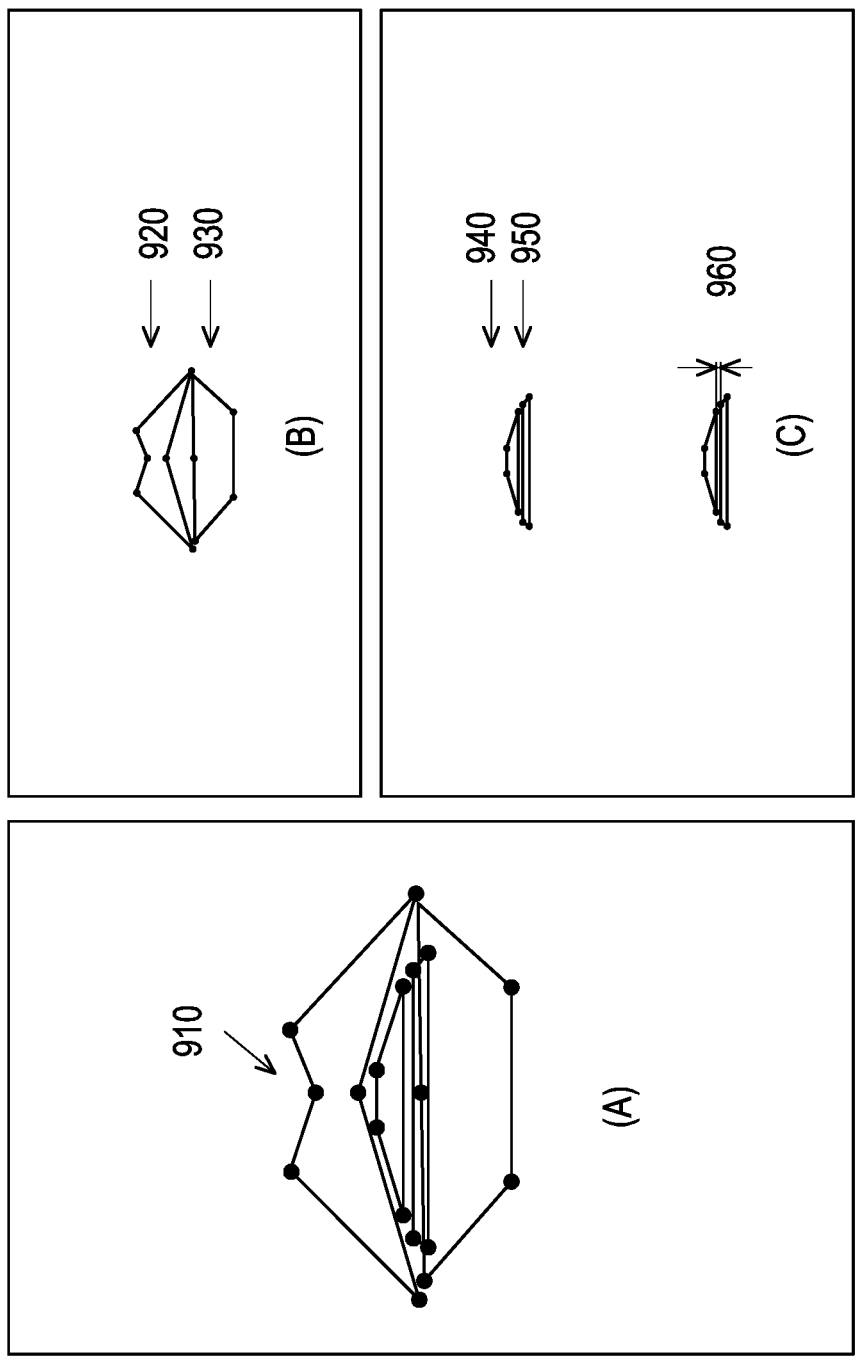
FIG. 10 is a schematic diagram of a lip activity recognition module in the fourth embodiment of the disclosure identifying the lip movement to obtain speech text information.

FIG. 10 is a schematic diagram of a lip activity recognition module in the fourth embodiment of the disclosure identifying the lip movement to obtain speech text information. The lip activity recognition module used in the fourth embodiment can determine the lip-shape dot distribution 910 in FIG. 10(A), upper lip shape 920 and lower lip shape 930 in FIG. 10(B) and the upper teeth range 940, lower teeth range 950, and upper and lower teeth spacing 960 in FIG. 10(C) through the lip area 108 captured by the second image capturing device (sensing device 812), thereby acquiring the speech delivered by the user through lips and converting the speech into text information.

Figure 11:
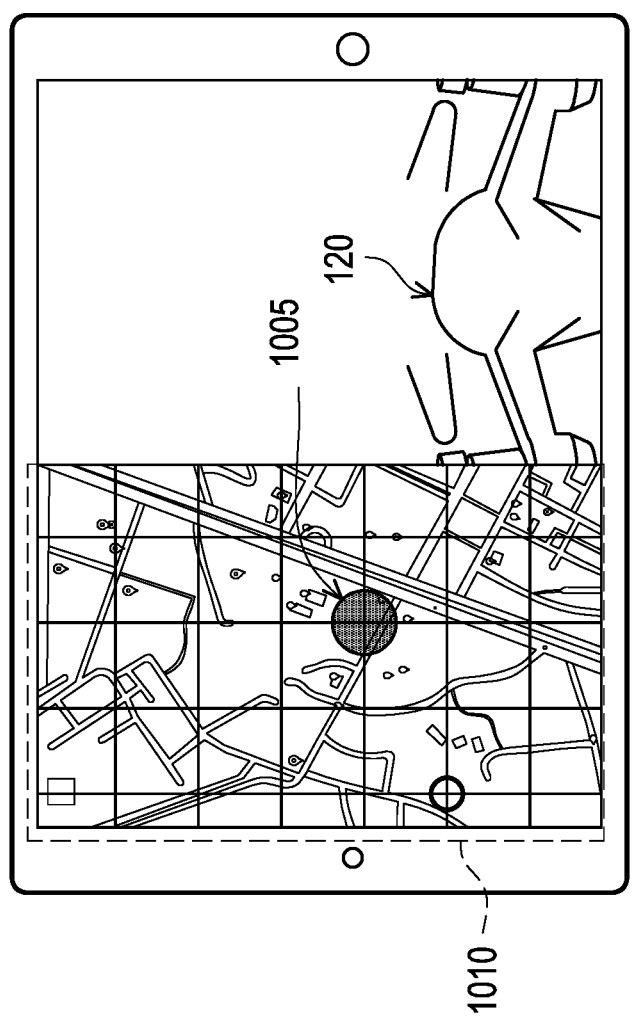
FIG. 11 is a schematic diagram of controlling the flying direction of the UAV120 by using the speech text information in the fourth embodiment of the disclosure.

FIG. 11 is a schematic diagram of controlling the flying direction of the UAV120 by using the speech text information in the fourth embodiment of the disclosure. The fourth embodiment in FIG. 11 is to control the flying direction of the UAV120 in a map mode. For example, the right half of the display of the control device in FIG. 11 presents the screen/image from the third-person view on the UAV120, and the left half 1010 of the display of the control device in FIG. 11 presents a map with multiple straight lines (such as, "A", "B", "C", "D") and horizontal lines (such as, "1", "2" . . . "6") to divide these maps in a grid pattern, and the position 1005 of the UAV120 is marked on the map. When the user opens his lips to say the text information "A" and "5" in sequence, the processor in the fourth embodiment of FIG. 11 sends a control signal to the UAV120 to move the UAV120 from the current position 1005 to the position "A-5" denoted by a point where the straight line "A" intersects with the horizontal line "5".

Figure 12:
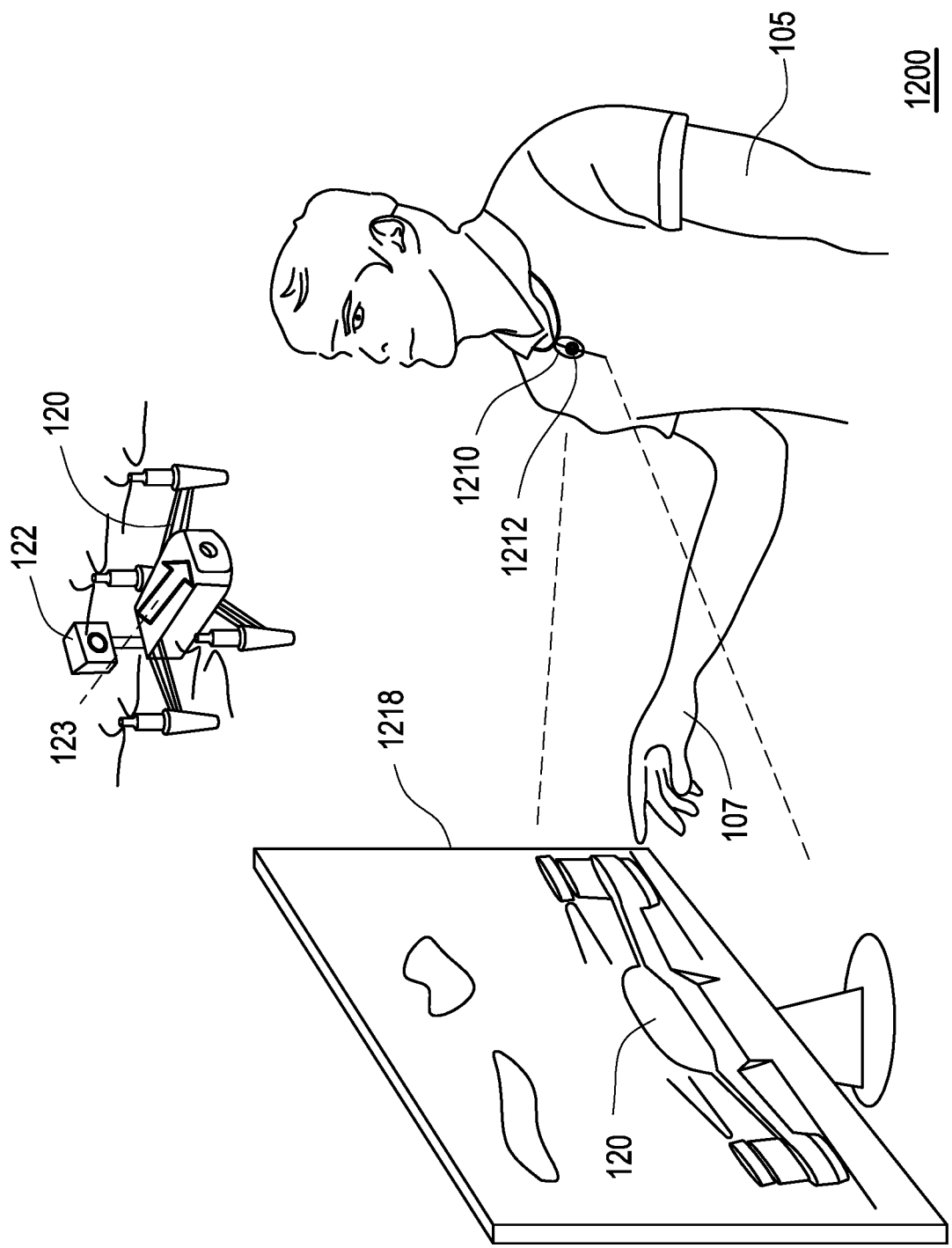
FIG. 12 is a schematic diagram of a UAV system according to the fifth embodiment of the disclosure.

FIG. 12 is a schematic diagram of a UAV system 1200 according to the fifth embodiment of the disclosure. The main difference between the fifth embodiment and the first embodiment is that the control device 1210 is changed from a head-mounted display device to a neck-mounted wearable device in implementation. In other words, the sensing device 1212 in the control device 1210 is arranged in front of the neck-mounted wearable device, and the sensing device 1212 includes a second image capturing device arranged in the direction facing the hand of the user 105. The second image capturing device (sensing device 1212) is configured to capture a second image including the hand of the user 105, and capture the hand area 107 in the second image. The processor in the control device 710 obtains the hand area 107 through the second image capturing device (sensing device 1212) to sense the hand action of the user, recognizes the hand action as a first gesture type of multiple preset gesture types through the gesture activity recognition module, and converts the first gesture type into a corresponding control signal to control the UAV120.

On the other hand, the control device 1210 implemented as a neck-mounted wearable device does not have a display itself. The control device 1210 can be controlled to communicate with an external display 1218 to be controlled, so that the image captured by the first image capturing device 122 on the UAV120 is transmitted through the image transmitter 123 and presented on the external display 1218. Not only that the user 105 can see the image on the external display 1218, but also the processor of the control device 1210 can generate a virtual hand image on the external display 1218 according to the hand action in the hand area 107, so that the user can confirm the gesture for operation on the external display 1218.

Figure 13:
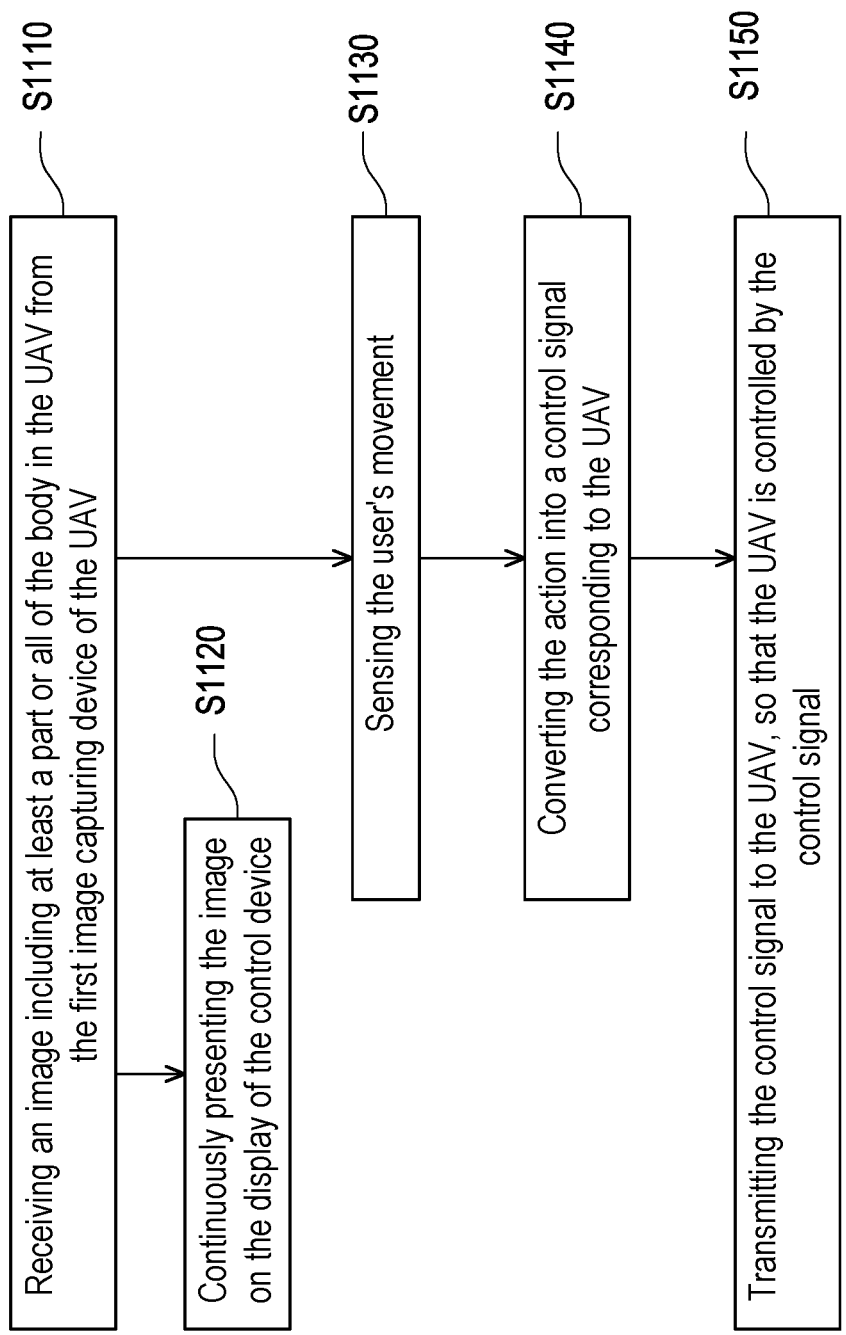
FIG. 13 is a flowchart of a control method for UAV according to various embodiments of the disclosure.

FIG. 13 is a flowchart of a control method for UAV according to various embodiments of the disclosure. This UAV control method is adaptable for controlling UAV control devices (such as head-mounted display devices, mobile electronic devices, etc.). In step S1110, the control device receives an image including at least a part or all of the body in the UAV from the first image capturing device of the UAV. In step S1120, the image is continuously presented on the display of the control device. In step S1130, the control device senses the user's movement through the sensing device on the control device. In step S1140, the control device converts the action sensed in step S1130 into a control signal corresponding to the UAV. In step S1150, the control device transmits the control signal to the UAV, so that the UAV is controlled by the control signal. For the detailed implementation of the control method in FIG. 13, please refer to the foregoing embodiments.

In summary, the control device for UAV and the control method therefor provided in the disclosure configure an image capturing device with a third-person view on the UAV, so that the user can intuitively see the UAV machine through the screen/image from the third-person view, and detect the user's actions (such as gestures, lip movement, or corresponding operating means) to control the UAV accordingly. In this way, the UAV system of the disclosure provides a more intuitive way to control the UAV by providing a third-person view combined with the user's somatosensory operation, thereby reducing the difficulty of control.

What is claimed is:

1. A control device for an unmanned aerial vehicle (UAV), comprising:
   a sensing device for sensing an action of a user;
   an image receiver for receiving an image comprising at least a part or all of a body in the UAV from a first image capturing device of the UAV;
   a control transmitter for transmitting a control signal to the UAV; and
   a processor coupled to the sensing device, the image receiver and the control transmitter,
   wherein the processor obtains the action through the sensing device, converts the action into the control signal corresponding to the UAV, and transmits the control signal to the UAV through the control transmitter,
   wherein the UAV is controlled by the control signal transmitted by the control device.

2. The control device according to claim 1, wherein the control device is a head-mounted display device,
   wherein the sensing device is arranged in front of the head-mounted display device and comprises a second image capturing device,
   the second image capturing device is configured for capturing a second image comprising a hand of the user, and capturing a hand area in the second image,
   wherein the processor obtains the hand area through the second image capturing device to sense a hand action of the user, recognizes the hand action as a first gesture type of a plurality of preset gesture types, and converts the first gesture type into the corresponding control signal.

3. The control device according to claim 2, wherein the processor further generates a virtual hand image according to the hand action, and superimposes the virtual hand image on the image presented on a display.

4. The control device according to claim 3, wherein the processor further presents a gesture range on the display, wherein the hand action within the gesture range is used as the control signal corresponding to identification.

5. The control device according to claim 1, wherein the control device is a mobile electronic device, and the sensing device is disposed in the mobile electronic device facing a direction of the user, and comprises a second image capturing device,
the second image capturing device is configured for capturing a second image comprising a hand of the user, and capturing a hand area in the second image,
wherein the processor obtains the hand area through the second image capturing device to sense a hand action of the user, recognizes the hand action as a first gesture type of a plurality of preset gesture types, and converts the first gesture type into the corresponding control signal.

6. The control device according to claim 1, wherein the control device is a mobile electronic device, and the sensing device is disposed in the mobile electronic device facing a direction of the user, and comprises a second image capturing device,
the second image capturing device is configured for capturing a second image comprising lips of the user, and capturing a lip area in the second image,
wherein the processor obtains the lip area through the second image capturing device to sense a lip movement of the user, recognizes the lip movement to obtain speech text information of the user, and converts the speech text information into the corresponding control signal.

7. The control device according to claim 1, wherein the control device is a neck-mounted wearable device,
wherein the sensing device is arranged in front of the neck-mounted wearable device and comprises a second image capturing device,
the second image capturing device is configured for capturing a second image comprising a hand of the user, and capturing a hand area in the second image,
wherein the processor obtains the hand area through the second image capturing device to sense a hand action of the user, recognizes the hand action as a first gesture type of a plurality of preset gesture types, and converts the first gesture type into the corresponding control signal.

8. The control device according to claim 7, wherein the processor communicates with a display to be controlled, so that the display presents the image, and further generates a virtual hand image according to the hand action, and superimposes the virtual hand image on the image presented on the display.

9. The control device according to claim 1, wherein the sensing device further comprises one of an infrared image capturing device, a flood illuminator, and a dot-matrix projector or a combination thereof.

10. A control method for a UAV, adaptable for a control device and a display, the control method comprising:
receiving an image comprising at least a part or all of a body in the UAV from a first image capturing device of the UAV;
controlling the display to continuously present the image;
sensing an action of a user, and converting the action into a control signal corresponding to the UAV; and
transmitting the control signal to the UAV, wherein the UAV is controlled by the control signal.

11. The control method according to claim 10, wherein the control device is a head-mounted display device, a sensing device is arranged in front of the head-mounted display device and comprises a second image capturing device,
the second image capturing device is configured for capturing a second image comprising a hand of the user, and capturing a hand area in the second image,
wherein the step of sensing the action of the user and converting the action into the control signal corresponding to the UAV comprises:
obtaining the hand area through the second image capturing device to sense a hand action of the user;
recognizing the hand action as a first gesture type of a plurality of preset gesture types through a gesture activity recognition module; and
converting the first gesture type into the corresponding control signal.

12. The control method according to claim 11, further comprising:
generating a virtual hand image according to the hand action; and
superimposing the virtual hand image on the presented image.

13. The control method according to claim 10, wherein the control device is a mobile electronic device, and the mobile electronic device comprises a second image capturing device disposed in a direction facing the user,
the second image capturing device is configured for capturing a second image comprising a hand of the user, and capturing a hand area in the second image,
wherein the step of sensing the action of the user, and converting the action into the control signal corresponding to the UAV comprises:
obtaining the hand area through the second image capturing device to sense a hand action of the user;
recognizing the hand action as a first gesture type of a plurality of preset gesture types through a gesture activity recognition module; and
converting the first gesture type into the corresponding control signal.

14. The control method according to claim 10, wherein the control device is a mobile electronic device, and the mobile electronic device comprises a second image capturing device disposed in a direction facing the user,
the second image capturing device is configured for capturing a second image comprising lips of the user, and capturing a lip area in the second image,
wherein the step of sensing the action of the user and converting the action into the control signal corresponding to the UAV comprises:
obtaining the lip area through the second image capturing device to sense a lip movement of the user;
recognizing the lip movement through a lip activity recognition module to obtain speech text information of the user; and
converting the speech text information into the corresponding control signal.

15. The control method according to claim 10, wherein the control device is a neck-mounted wearable device, the neck-mounted wearable device comprises a second image capturing device arranged in a direction facing a hand of the user, the second image capturing device is configured for capturing a second image comprising the hand of the user, and capturing a hand area in the second image, wherein the step of sensing the action of the user and converting the action into the control signal corresponding to the UAV comprises:

obtaining the hand area through the second image capturing device to sense a hand action of the user;

recognizing the hand action as a first gesture type of a plurality of preset gesture types through a gesture activity recognition module; and converting the first gesture type into the corresponding control signal.

* * * * *